UNITED STATES PATENT OFFICE.

EDWARD T. STEEN AND WILLIAM B. MAY, OF SAN FRANCISCO, CALIFORNIA.

IMPROVED PROCESS OF REMOVING SOLUBLE MATTERS FROM ARTIFICIAL STONE.

Specification forming part of Letters Patent No. 89,805, dated May 4, 1869.

*To all whom it may concern:*

Be it known that we, EDWARD T. STEEN and WILLIAM B. MAY, of the city and county of San Francisco, State of California, have invented a new and Improved Process for Purging Artificial Stone from Saline and other Substances; and we do hereby declare that the following is a full, clear, and exact description of our process, sufficient to enable any person skilled in the art or science to which it relates, to use the same without further invention or experiment.

Our invention relates to a new and improved method or process for removing salt and other soluble impurities from artificial stone, and more particularly from that kind known as Ransom's concrete, or artificial stone for building and other purposes.

In preparing the Ransom concrete or artificial stone, after the sand employed for its manufacture has been dried and mixed with the silicate of soda, a solution of chloride of calcium is added, which hardens or petrifies the mass.

The result of the contact of the silicate of soda and chloride of calcium is the decomposition of both, which reunite as silicate of lime and chloride of sodium, or common salt.

In order to properly prepare the stone, the chloride of sodium, or salt must be removed, which is commonly done by means of a shower of water, which is allowed to fall upon it, and percolate through it, liquefying and carrying off the salt, requiring from twenty-four to thirty-six hours of constant purging to entirely eradicate it.

In our process, we simply take the stone after it has been formed and petrified, and place it over some suitable air-tight vessel, after which, by means of an air-pump, or other competent device, we exhaust the air from the vessel; and consequently open the pores or sacs in the stone. A stream of water is then allowed to fall upon the stone, which, owing to the pressure caused by the vacuum beneath, will freely permeate every portion, and in a very few minutes entirely free the stone from all saline and other soluble matter.

The salt being in a "disturbed crystallized" form, readily liquefies when water is brought in contact with it, and by means of the vacuum beneath the stone the water is carried through in sufficient quantities in a very short time to wash it out.

By this means we are enabled to reduce the expense in the preparation of the stone, much less water being required. The stone can be manufactured and purged without extra trouble or delay, and much more thoroughly than by simple infiltration, as the blocks of stone are frequently found to be imperfectly freed from salt even after remaining under a stream of water for many hours, when used in the ordinary way.

Having thus described our invention,

What we claim, and desire to secure by Letters Patent, is—

Purging soluble substances from artificial stone, in the manner substantially as above described.

In witness whereof we have hereunto set our hands and seals.

EDWARD T. STEEN. [L. S.]
WM. B. MAY. [L. S.]

Witnesses:
A. T. DEWEY,
GEO. H. STRONG.